Patented Nov. 14, 1939

2,180,314

UNITED STATES PATENT OFFICE 2,180,314

SULPHONIC ACIDS OF AROMATIC COMPOUNDS

Charles A. Thomas, Dayton, Ohio, assignor to The Sharples Solvents Corporation, Philadelphia, Pa.

No Drawing. Application May 18, 1939, Serial No. 274,362

4 Claims. (Cl. 260—505)

The present invention pertains to new compositions of matter consisting of novel chemical compounds and mixtures which are particularly useful as washing, wetting and emulsifying agents. In recent years, acids and esters formed by sulphonating or sulphating various organic chemicals, such as long-chain aliphatic alcohols and alkylated aromatic compounds and the alkali metal derivatives of such sulphonated and sulphated products, have found utility in this field. The familiar Gardinol and Igepon detergents are examples of such compounds.

The object of the present invention has been to provide a new group of sulphonic detergents consisting of novel chemical compounds having superior detergent qualities.

The present application is a continuation in part of my prior application, Serial No. 699,924, filed November 27, 1933, for "Washing, wetting and emulsifying agents."

The invention rests upon the production of a new group of compounds consisting of the sulphonic acids of condensation products formed by the reaction of two or more molecules of an aryl hydrocarbon such as benzene or naphthalene upon a polyhalide derivative of a paraffin hydrocarbon containing 8 to 20 carbon atoms in its alkyl radical, or diolefin of similar carbon content, as well as the salts of said acids, such as sodium, potassium and ammonium salts. These compounds, whether in pure form or in admixture with each other, or with other detergent compositions, possess remarkable detergent and wetting properties and are capable of reducing the surface tension of water to an unusual degree when dissolved therein.

The compounds of the invention may be produced by preliminarily forming a poly-substituted benzene or naphthalene derivative of a paraffin hydrocarbon by condensing with benzene or naphthalene diolefin or admixtures of diolefins having a carbon content corresponding to the desired radical to which the aryl radicals are to be attached at each of the double bonds. The resulting product, which may be regarded as a paraffin hydrocarbon having aryl radicals substituted for two of its hydrogen atoms, is thereafter sulphonated to produce the desired sulphonic acid derivative.

The initial reaction of condensing the aryl compound with an aliphatic derivative containing the desired number of carbon atoms, may be performed by mixing the diolefin, which preferably contains between 8 and 20 carbon atoms, with a large molecular excess of benzene or naphthalene, and thereafter gradually adding zinc chloride or aluminium chloride to the mixture during cooling, while maintaining thorough agitation. The reaction mixture is then neutralized, washed and treated with sulphuric acid for removal of color. The resulting composition is then again neutralized, and the remaining mixture is thereafter washed with water and distilled under vacuum to obtain a relatively pure mixture of the desired condensation product.

Diaryl derivatives of paraffin hydrocarbons may likewise be produced from the corresponding polychlor derivatives of the paraffin hydrocarbons by reacting said polychlor derivatives with the aromatic hydrocarbon which is to form the nucleus of the desired compound in the presence of aluminum chloride, zinc chloride, or other equivalent Friedel-Crafts catalyst, the aromatic hydrocarbon being present in the reaction mixture in an amount constituting more than twice the amount constituting a molecular equivalent of the poly-halide present.

After the desired poly-aryl-substituted paraffin hydrocarbon derivative is produced as described above, it is treated with a strong sulphonating agent such as oleum or chlor-sulphonic acid, the compound to be sulphonated being gradually added to the sulphonating agent while stirring and cooling the mixture. At the completion of the sulphonation reaction, water is added to the mixture and the viscous layer, containing the desired sulphonic acid derivative or mixture, is separated from the residue. This layer may thereafter be neutralized with sodium, potassium, or ammonium hydroxide and heated over an air bath until solid. The resulting product possesses remarkable wetting and detergent properties.

EXAMPLES

*Example 1.—Preparation of sodium salt of phenyl decyl benzene sulphonic acid*

$$(C_6H_5—C_{10}H_{20}—C_6H_4—SO_3Na).—$$

1420 pounds of a cut of Pennsylvania oil, boiling between 165–175° C., is placed in a 400 gallon, glass-lined, jacketed kettle. The material is then heated to 90° C. and kept at this temperature while 1420 pounds of chlorine is introduced through a dispersing tube. The product is now subjected to a careful vacuum fractionation through a glass-lined column packed with ceramic Raschig rings. In this manner approximately 1500 pounds of product, boiling between 130–150° C. at 22 mm. is obtained. The gravity of this material is between 1.07 and 1.10. This crude dichlorodecane cut is now transferred to a 1000 gallon, lead-lined, agitated reactor where it is mixed with 500 gallons of benzene. Heat is then applied to the jacket until the temperature of 120° is reached (15 pounds gauge pressure). With stirring 75 pounds of powdered aluminum chloride is gradually added; the hydrogen chloride liberated in the reaction is vented in such manner as to keep the pressure on the system below 35 pounds gauge. After the completion of the addition of the aluminum chloride, the material is kept at 110–120° for an additional two hours and allowed to settle for one-half hour. The material is then subjected to decantation by which process the lower layer, consisting of a dark colored catalyst complex, is first removed. A benzene solution of alkylated aryl hydrocarbon is then withdrawn and treated with kieselguhr in small quantity and filtered. Upon fractionation, the diphenyl decane is obtained as a pale yellow oil, boiling between 210–240° at 5 mm. pressure. It possesses a specific gravity of about 0.965.

The diphenyl decane is sulphonated in the following manner: 100 gallons of diphenyl decane is placed in a lead-lined jacketed vessel equipped with an agitator. Keeping the temperature between 20–30° C., 150 gallons of 98% sulphuric acid is slowly added. After the addition of the sulphuric acid, the temperature is raised to 40° C. for one hour and then heated at 55–60° for an additional hour. The product is then allowed to settle for a period of three hours. Separation into two layers will occur; the lower layer consisting of excess sulphuric acid containing the water of reaction and the upper layer consisting of viscous phenyl decyl benzene sulphonic acid. The separation of this mixture into layers may be facilitated by the addition of ten gallons of water to the reaction mass at the end of the sulphonation. The phenyl decyl benzene sulphonic acid is a light brown liquid that contains small quantities of sulphuric acid in solution. The latter may be removed in the usual manner for the treatment of sulphonic acid by the addition of an excess of lime, or it may be dissolved in benzene in which the sulphonic acid is freely soluble but in which the sulphuric acid is not. However, the presence of a small quantity of excess sulphuric acid is a matter of small importance, for upon treatment with alkalies or alkali carbonates it will be changed to a metallic sulphate which does not interfere with the wetting and washing properties of the detergent.

The sulphonic acid layer obtained above may be neutralized in any suitable manner to form its alkali metal, alkaline earth, ammonium, or alkyl ammonium salt. A suitable procedure consists of the titration of a portion of the sulphonic acid and its addition with stirring to the requisite amount of 15% sodium hydroxide solution. Upon being neutralized in this manner, the brown color of the sulphonic acid is discharged leaving a pale yellow solution of the sodium salt of phenyl decyl benzene sulphonic acid. The product, if desired in the anhydrous state, may be now evaporated either at atmospheric pressure or under vacuum until it has reached a sufficient degree of dehydration so that it may be poured on a rotary drier for the final drying operation. In this manner the salt is obtained as a yellow powder. A recrystallization of this powder will yield almost white detergent. Such recrystallization may be advantageously carried out in the presence of an alcohol, such as methanol. The phenyl decyl benzene sulphonic acid so obtained possesses strong detergent characteristics.

Example 2.—*Naphthyl dodecyl naphthalene sulphonic acid (sodium salt)*

$(C_{10}H_7—C_{12}H_{24}—C_{10}H_6—SO_3Na)$.—

A hydrocarbon cut of Michigan crude boiling between 205–215° C. is chlorinated in the manner previously described until it contains approximately two chlorine atoms. The crude dichlorododecane, without fractionation, is then condensed with 4 mols of naphthalene in the presence of aluminum chloride. After removal of the catalyst complex the hydrocarbon layer is treated with three successive 3% charges of 200 mesh contact clay; the latter treatment yielding a very marked improvement of the color of the crude product. After distillation to remove excess naphthalene, the material is then treated with 1½ volumes of 98% sulphuric acid as shown in Example 1. The sulphonic acid layer is withdrawn and neutralized with sodium hydroxide to yield the sodium salt of naphthyldecyl naphthalene sulphonic acid. This product may be dried to a pale brown powder. Treatment of this powder in alcoholic solutions with decolorizing carbon will yield a product substantially improved in appearance. The compound, while possessing poor wetting out properties, is characterized by good detergency.

Example 3.—*Compounds from dichloro octadecane and anthracene.*—A cut from a Michigan crude furnace oil, boiling between 300–324° C., consisting essentially of octadecane, is chlorinated until it contains two atoms of chlorine per mol of hydrocarbon. This is now condensed with 3 mols of technical anthracene in the presence of aluminum chloride. After purification as described in the preceding Examples #1 and #2, the hydrocarbon is converted to its disulphonic acid by warming with 4 volumes of 66° Baumé sulphuric acid to 70° C. for a period of two hours. The sulphonic acid is then converted to sodium salt and dried.

Modifications will be obvious to those skilled in the art, and I do not therefore wish to be limited except by the scope of the subjoined claims.

I claim:

1. As new chemical compounds, compounds chosen from the class consisting of sulphonic acids of poly-aryl derivatives of paraffin hydrocarbons containing from 8 to 20 carbon atoms, and the alkali metal salts of such acids, said compounds being useful as washing, wetting and emulsifying agents.

2. As new chemical compounds, compounds chosen from the class consisting of sulphonic acids of poly-aryl derivatives of paraffin hydrocarbons containing from 8 to 20 carbon atoms, the aryl radicals of such compounds being chosen from the class consisting of phenyl, naphthyl, and anthracyl radicals, and the alkali metal salts of such acids, said compounds being useful as washing, wetting and emulsifying agents.

3. As new chemical compounds, compounds chosen from the class consisting of sulphonic acids of poly-phenyl derivatives of paraffin hydrocarbons containing from 8 to 20 carbon atoms, and the alkali metal salts of such acids, said compounds being useful as washing, wetting and emulsifying agents.

4. As new chemical compounds, compounds chosen from the class consisting of sulphonic acids of poly-naphthyl derivatives of paraffin hydrocarbons containing from 8 to 20 carbon atoms, and the alkali metal salts of such acids, said compounds being useful as washing, wetting and emulsifying agents.

CHARLES A. THOMAS.